United States Patent [19]

Eisenberg

[11] 3,728,635

[45] Apr. 17, 1973

[54] PULSED SELECTABLE DELAY SYSTEM

[75] Inventor: Robert M. Eisenberg, Derwood, Md.

[73] Assignee: The Singer Company, Binghampton, N.Y.

[22] Filed: Sept. 8, 1971

[21] Appl. No.: 178,757

[52] U.S. Cl. ........................328/55, 328/44, 328/37, 328/48, 235/92 PE, 235/92 CC

[51] Int. Cl. ................................................H03k 5/13

[58] Field of Search......................235/92 CC, 92 PE; 328/44, 48, 55, 164, 37; 307/293

[56] References Cited

UNITED STATES PATENTS

| | | | |
|---|---|---|---|
| 2,493,627 | 1/1950 | Grosdorf | 328/48 X |
| 2,519,184 | 8/1950 | Grosdorf | 328/48 |
| 3,435,196 | 3/1969 | Schmid | 235/92 CC |
| 3,453,551 | 7/1969 | Haberle | 328/44 X |
| 3,493,715 | 2/1970 | Bigowsky et al. | 328/48 X |
| 3,504,290 | 3/1970 | Earle | 328/164 |
| 3,564,426 | 2/1971 | Anderson et al. | 328/48 |

*Primary Examiner*—John S. Heyman
*Attorney*—Francis L. Masselle et al.

[57] ABSTRACT

This is a system which provides a train of output pulses that duplicate a train of input pulses but which output pulses are delayed a selective amount in time. A first counter receives a digital word which represents the amount of time that the output is to be delayed after the input. A clock supplies the counter with timed pulses, and when the capacity of the counter has been reached, its output initiates the output pulse. A second counter counts upwardly during the period of time that an input pulse exists. Upon decay of the input pulse, the second counter is inhibited from further counting until the output from the first counter is generated. At that time, the second counter begins counting down, and when it reaches zero, an output signal is generated which terminates the output pulse.

4 Claims, 1 Drawing Figure

PATENTED APR 17 1973 3,728,635
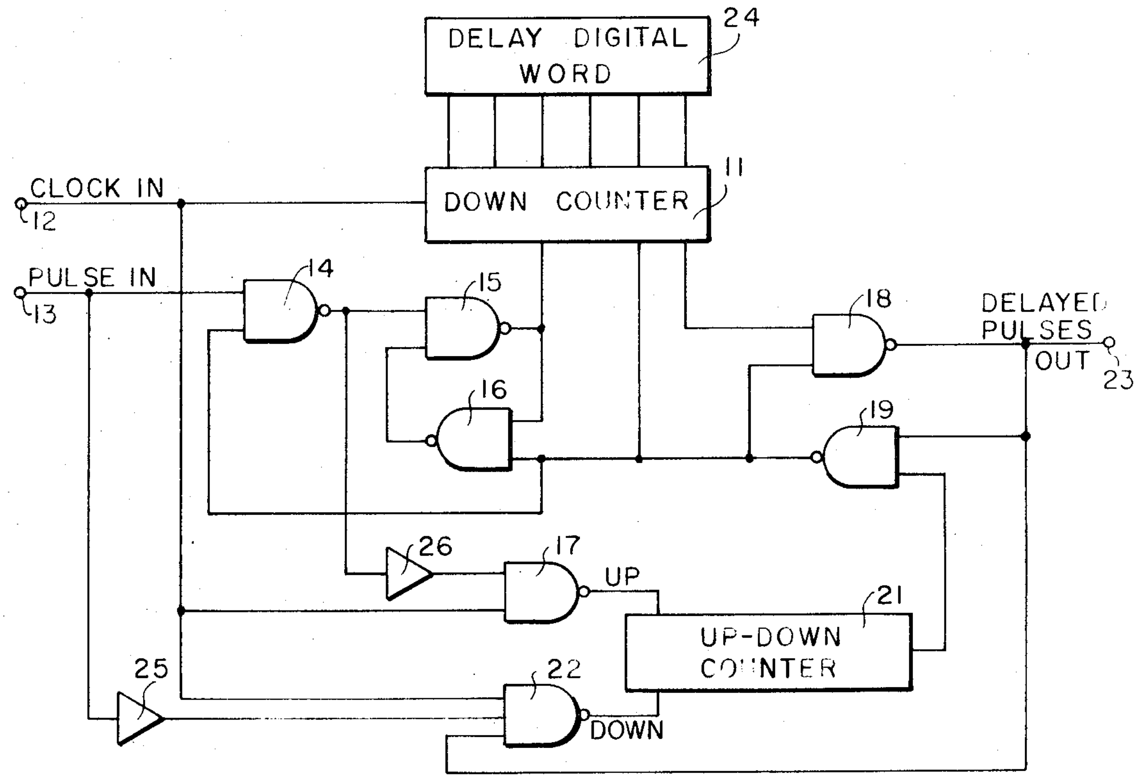

PULSED SELECTABLE DELAY SYSTEM

This invention relates to electronic devices for delaying electrical signals by a selectable amount of time.

Delaying signals in time is not new. In the communications art, delay lines of many types have been fabricated for many uses. However, delay lines and similar devices of that type are suitable for use only with sine wave signals. When signals of other forms and shapes are applied to delay lines, the shapes of said signals are so modified thereby that the output from the delay lines no longer resembles the input. Further, delay lines, of which there are many kinds, usually are not adjustable so that the amount of delay imposed by any delay line is fixed. Pulses have been delayed in the past by using delay flops which are one-shot multivibrators. However, one-shots are not readily adjustable in time delay, and the output pulse width is fixed.

There are many situations where circuitry for accepting pulses of different widths, delaying them by selectable amounts of time, and then reproducing them in the same form is useful. As mentioned above, most of the prior art devices either are not readily selectable in the amount of delay they produce or they require pulse formers on their outputs to overcome degeneration of the delayed pulses.

It is an object of this invention to provide a new and improved electronic circuit.

It is another object of this invention to provide a new and improved system for delaying pulses of varying widths.

It is a further object of this invention to provide a new and improved electronic delay device.

It is still another object of this invention to provide a new and improved system for reproducing pulses in their original form, but delayed in time.

Other objects and advantages of this invention will become more apparent as the following description proceeds, which description should be considered together with the accompanying drawing in which the single FIGURE is a block diagram of the system according to this invention.

Referring now to the drawing in detail, reference character 11 designates a counter having a plurality of input lines connected in parallel to control device 24. An input terminal 12 is connected to the count input of the counter 11 and is adapted to be connected to a source of clock pulses. The terminal 12 is also connected to one input of a NAND gate 17 and to one input of a NAND gate 22. A second input terminal 13 is adapted to be connected to a source of pulses which are to be delayed. The terminal 13 is connected through an inverter 25 to another input of gate 22 and to one input of a NAND gate 14. The output from the gate 14 is connected to one input of a NAND gate 15 and through an inverter 26 to one input of gate 17. The output from the gate 15 is connected to the counter 11 and to one input of a NAND gate 16. The output from the NAND gate 16 is connected as the other input to the gate 15. The output from the counter 11 is connected as one input to a NAND gate 18 whose output is connected to the output terminal 23. The output from the gate 18 is also connected to another input to the gate 22 and to one input of a NAND gate 19. The output from the gate 19 is applied to the other input to the gate 18, as the other input to the gate 16, and as another input to the gate 14. The output from the gate 17 is applied as one count input of a counter 21, and the output from the gate 22 is connected to the other count input of the counter 21. The output from the counter 21 is applied as a second input to the gate 19.

In operation, a digital word representing the amount of delay is transferred from the control device 24 into the counter 11. The control device 24 may be any suitable source of a digital word such as a computer, a plurality of memory locations with suitable addressing means, manually controlled switches, and the like. The counter 11 is, preferably, a binary, down-counting counter which means it receives and stores information in binary form and counts input pulses downwardly from that information in accordance with binary arithmetic. The clock pulses supplied to the terminal 12 are applied to the counter 11 and are counted thereby. Once a number has been inserted into the counter 11 and it begins counting, the counter 11 produces an output when that count reaches zero. Should the counter 11 be an up-counting counter, then the complement of the word would be inserted therein and an output would be generated by the counter 11 when it counted to its capacity and generated an overflow signal. If the pulses applied to the input terminal 12 are, for example, 1 MHz pulses, then each count of the counter 11 represents a microsecond. The counter 11 is normally inhibited from counting by a low output signal from the gate 15. The low output signal from the gate 15 also applies a low signal to one input of the gate 16. Since the gates used in this system are NAND gates, a low signal on one input of the gate 16 drives its output high. Therefore, one input to the gate 15 is high. So long as no positive pulse appears at the input terminal 13, the output of the gate 14 will supply a second high input to the gate 15 holding its output low. When a positive pulse appears at the input 13 and the output of gate 19 is high, the output from the gate 14 is low, driving the output of the gate 15 high and enabling the counter 11 to count. Thus, when an input pulse appears at the terminal 13, the counter 11 begins counting. The output from the counter 11 is normally high, applying one high input to the gate 18. The output of the gate 19 is normally high which places two high inputs on the gate 18 and maintains the output terminal 23 low. The low output from the gate 18 provides a low input to the gate 19 and also one low input to the gate 22. THe output from the counter 21 is also normally high but since the other input to the gate 19 is low, its output is high. The high output from the gate 19 is also applied as one high input to the gate 16. The two high inputs to the gate 16 maintain its output low while the counter 11 is counting so that even though the input pulse decays from the terminal 13, and the other input to the gate 15 goes high, the low output from the gate 16 maintains the gate 15 output high. The counter 11 continues to count the clock pulses until it generates an output signal. The output signal is low which drives the output of the gate 18 high. This means that when the counter 11 has counted and the specified interval of time after the pulse appeared at the terminal 13 has been reached, a positive pulse is generated at the output terminal 23. When the output of the gate 18 goes high, it drives the other input to the gate 19 high driving its output low. This applies a low signal to one input of the gates 14 and 18 maintaining their outputs high. The output from the gate 19 is also applied to the other input to the gate 16, giving the gate 16 one low input signal. This drives the output from the gate 16 high causing the output of the gate 15 again to go low and causing the counter 11 to stop counting. In this manner, at a prescribed time after a positive pulse appears at the input terminal 13 it appears also at the output terminal 23.

When the input terminal 13 went high, one of the inputs to the gate 17 also went high. Thus, whenever a positive clock pulse appears on the input terminal 12, the output from the gate 17 goes low applying a low input signal to the counter 21. The gate 17 has two high input signals applied to it only during the time that the input pulse applied to terminal 13 remains positive and the counter 11 has not counted to zero. That means that counter 21 will be counting the clock pulses during the time that the input pulse exists at the output of gate 14. Once the input pulse at the terminal 13 decays or the counter 11 reaches zero, that input to the gate 17 goes low and the gate 17 no longer responds to the clock pulses. The counter 21 then stops counting, but retains the number that it had counted. When the output of the gate 18 goes high (at the beginning of the output pulse), one input to the gate 22 goes high. Also, when the pulse at terminal 13 decays, a second input to gate 22 goes high. Thereafter, whenever a clock pulse applied to the terminal 12 goes high, the output from the gate 22 is driven low applying pulses to the counter 21. The counter 21 is an up-down counting counter. Pulses which are applied to it from the gate 17 cause the counter to count upwardly. Pulses applied to the other input from the gate 22 cause the counter 21 to count down. Therefore, when pulses are applied to the counter 21 from the gate 22 after it had stopped counting upwardly, the counter 21 counts downwardly until it reaches zero. When the contents of the counter 21 reach zero, the counter generates a low output signal which drives one input to the gate 19 low, causing its output to go high. This applies a high signal to the other input to the gate 18 whose one input had already been high from the output of the counter 11. The output from the gate 18 is then driven low terminating the output pulse at the terminal 23. At the same time, the counter 11 is reset to the delay word from control device 24, the other input to the gate 16 is driven high and one input to the gate 17 is driven high, conditioning these gates for the next input signal.

To summarize the operation of the apparatus, the word which is inserted into the counter 11 determines how long counter 11 will count. Counter 11 is inhibited from counting until an input signal appears at the input terminal 13. No signal appears at the output terminal 23 until the counter 11 generates an output signal. Since the counter 11 does not begin counting until an input signal appears, the output signal is not generated until the counter 11 has counted the appropriate time interval. At the same time, when an input signal appears at the terminal 13, the counter 21 begins counting upwardly and continues to count upwardly until the input signal at the terminal 13 disappears. At that time, the counter 21 stops counting upwardly and retains its count. The counter 21 begins counting downwardly when the counter 11 generates its output signal. This is the time that the output pulse is generated at the terminal 23. When the counter 21 has counted down to zero, it generates an output signal that terminates the generation of the output pulse at terminal 23 and reconditions the entire apparatus for a new cycle. In this manner, the counter 21 receives a number which is equivalent to the width of the pulse applied to the input terminal 13 or the time delay, whichever is lesser, and counts down by the same amount of time to determine the width of the output pulse at the terminal 23. This process occurs even when the delay is less than the width of the input pulse.

The above specification has described a new and improved system for generating output pulses which have the same width as input pulses applied to the system, but which have been delayed by a prescribed amount. The width of the input pulses may vary over a wide range of widths, and they are reproduced at the output over the same wide range. The amount of delay imposed between the appearance of a pulse at the input of the system and the generation of the pulse at the output of the system is selectable. The precision with which both the time interval of delay and the pulse width may be reproduced by the system of this specification is controlled by the frequency of the clock pulses. It is realized that the above description may indicate to other skilled in the art additional ways in which the principles of this invention may be utilized without departing from its spirit. It is, therefore, intended that this invention be limited only by the scope of the appended claims.

What is claimed is:

1. Apparatus for generating output signal pulses which are identical to but delayed in time from input signal pulses, said apparatus comprising a first counter, means for loading said first counter with a digital word representing the time interval that the pulse generation is to be delayed, a second counter, a source of clock pulses applied to said first and second counters to be counted thereby, means for applying input signal pulses to said first and second counters to cause said counters to count clock pulses from said source, said first counter generating an output signal when it counts to its limit, said second counter counting clock pulses so long as an input signal pulse exits, means connected to the output of said first counter for initiating the generation of an output signal pulse when said first counter generates an output signal, means for connecting said second counter to the output of said first counter to cause said second counter to count clock pulses from said source in an opposite manner when said first counter generates an output signal, and means for terminating the generation of said output signal pulse when said second counter reaches zero.

2. Apparatus for generating output signal pulses, which are identical to but selectively delayed from input signal pulses, said apparatus comprising a delay counter, a source of timing pulses, means for inserting into said delay counter a digital word representative of the selected delay, means for applying to the count input of said delay counter timing pulses to be counted from the value of the inserted word, means for inhibiting said delay counter from counting, means for applying input signal pulses to said inhibiting means for causing said delay counter to count timing pulses when an input signal pulse is present, means connected to the output of said delay counter to initiate the generation of an output signal pulse when said counter produces an output signal, a pulse width counter, means for connecting the count input of the pulse width counter to said source of timing pulses, means connected to said pulse width counter and responsive to an input signal pulse to cause said pulse width counter to count timing pulses so long as an input signal pulse is present, means responsive to the production of an output signal by said delay counter for causing said pulse width counter to count in the opposite direction, and means responsive to a zero count in said pulse width counter for terminating the generation of an output signal pulse.

3. The apparatus defined in claim 3 further including means responsive to the production of an output signal by said interval counter to halt the counting of timing pulses by said pulse width counter whereby said pulse width counter is halted by the occurance of the first of the termination of an input signal pulse or by an output signal from said interval counter.

4. Apparatus for generating duplicate signal pulses from input signal samples at selected time intervals, said apparatus comprising means for receiving a sample input signal pulse, a first counter, a source of clock pulses, means for inserting into said first counter a number whose value is representative of a time interval, means for applying an input signal pulse from said receiving means to said first counter to initiate the counting of clock pulses by said counter until the capacity of said counter is reached, said counter generating an output signal when its capacity is reached, means responsive to the generation of a counter output signal for terminating further counting by said counter, means responsive to the output from said first counter for generating an output signal pulse, means for determining the width of the output signal pulse, said width determining means comprising a width counter, means for supplying clock pulses to be counted by said width counter while said signal pulse is applied to said receiving means, means for interrupting the operation of said width counter when the signal pulse is no longer present at said receiving means, means for initiating the operation of said width counter in the opposite direction when said interval counter produces an output signal, and means for terminating the generation of said output signal pulse when said width counter reaches a zero value.

* * * * *